United States Patent [19]

Herrera E.

[11] Patent Number: 5,748,910
[45] Date of Patent: May 5, 1998

[54] AUTOMATIC ENABLING/DISABLING OF TERMINATION IMPEDANCE FOR A COMPUTER BUS

[75] Inventor: Oscar R. Herrera E., Greeley, Colo.

[73] Assignee: Hewlett-Packard Company, Palo Alto, Calif.

[21] Appl. No.: 594,190

[22] Filed: Jan. 31, 1996

[51] Int. Cl.$^6$ .................................................. G06F 13/00
[52] U.S. Cl. .............................. 395/281; 395/283; 326/30
[58] Field of Search ................................ 395/281, 282, 395/283; 326/30, 82; 327/321, 580, 545

[56] References Cited

U.S. PATENT DOCUMENTS 5,313,595  5/1994  Lewis et al. .............................. 395/306
5,434,516  7/1995  Kosco .

Primary Examiner—Jack B. Harvey
Assistant Examiner—Ario Etienne
Attorney, Agent, or Firm—Augustus W. Winfield

[57] ABSTRACT

A system and method for automatically enabling and disabling a termination impedance circuit for a computer bus. A peripheral device on the computer bus has two external bus connectors. A connector cover is provided for at least one of the peripheral bus connectors. The connector cover must be removed before a mating bus cable connector can be attached. The presence or absence of the connector cover is detected by sensor within the peripheral device. If a connector cover is detected, one of the peripheral bus connectors must be open (not connected to the bus) and termination is enabled. If a connector cover is not detected, termination is disabled. In one embodiment, the connector cover has a projection that passes into the peripheral device. In an alternative embodiment, a reflective surface is used. The cover may optionally be captured by a hinged edge or attached via a tether.

8 Claims, 10 Drawing Sheets

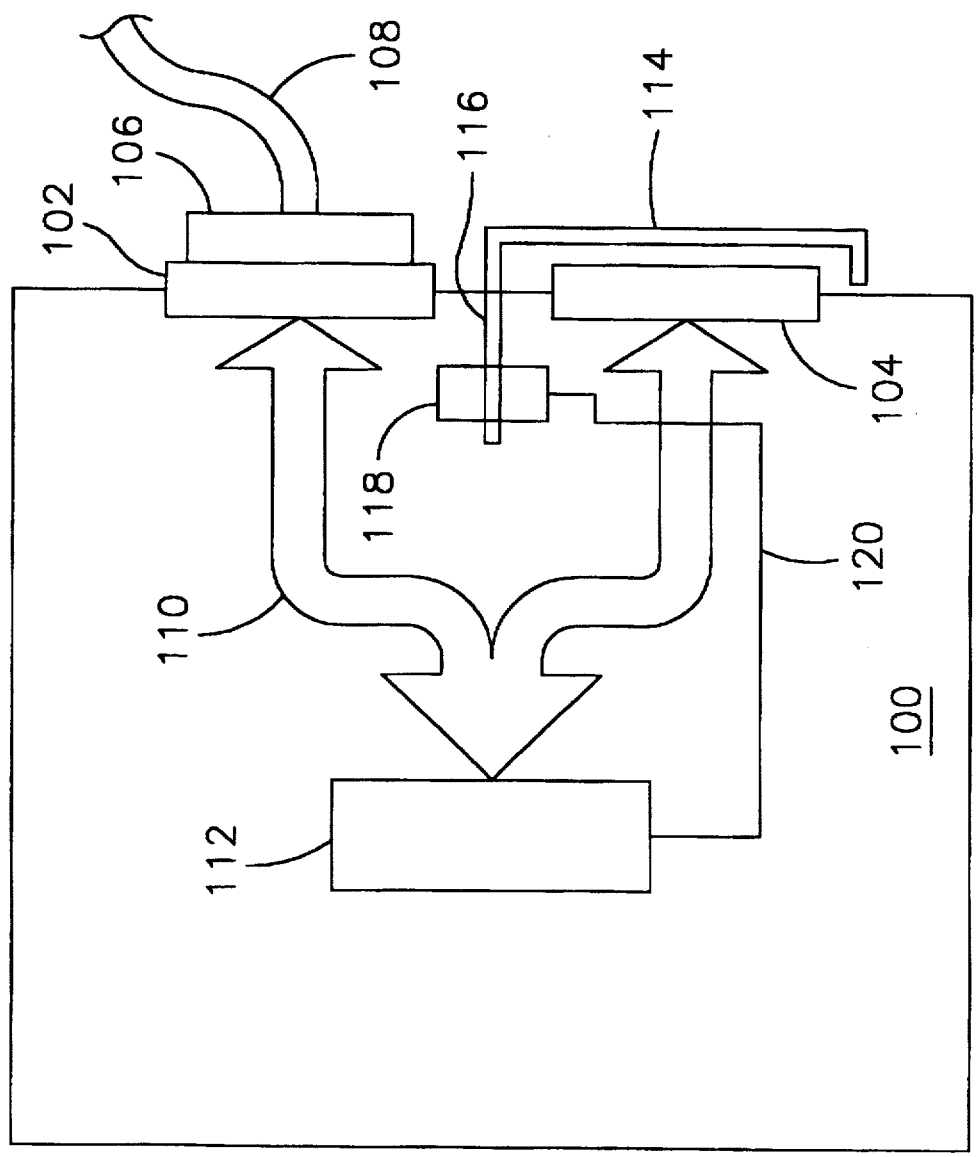

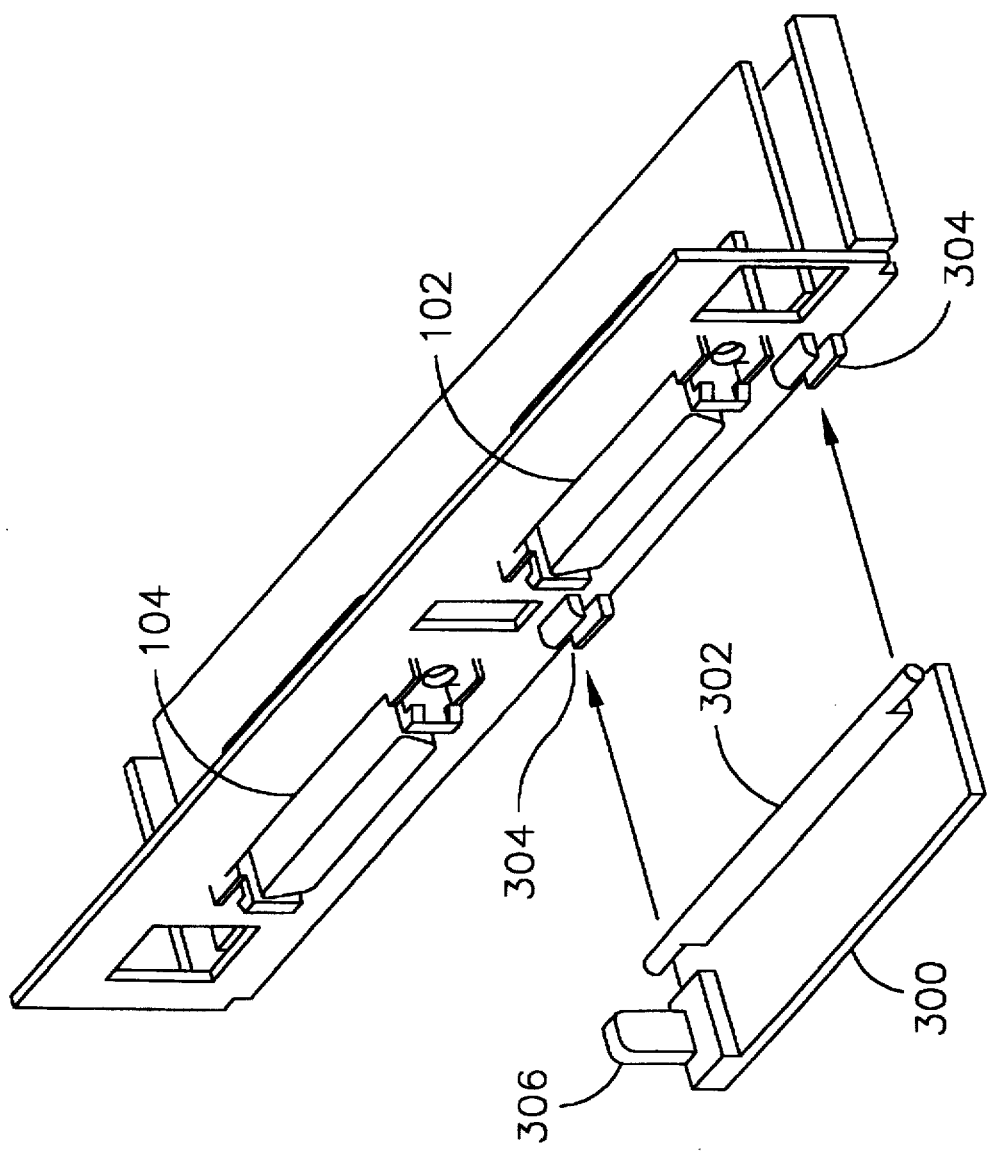

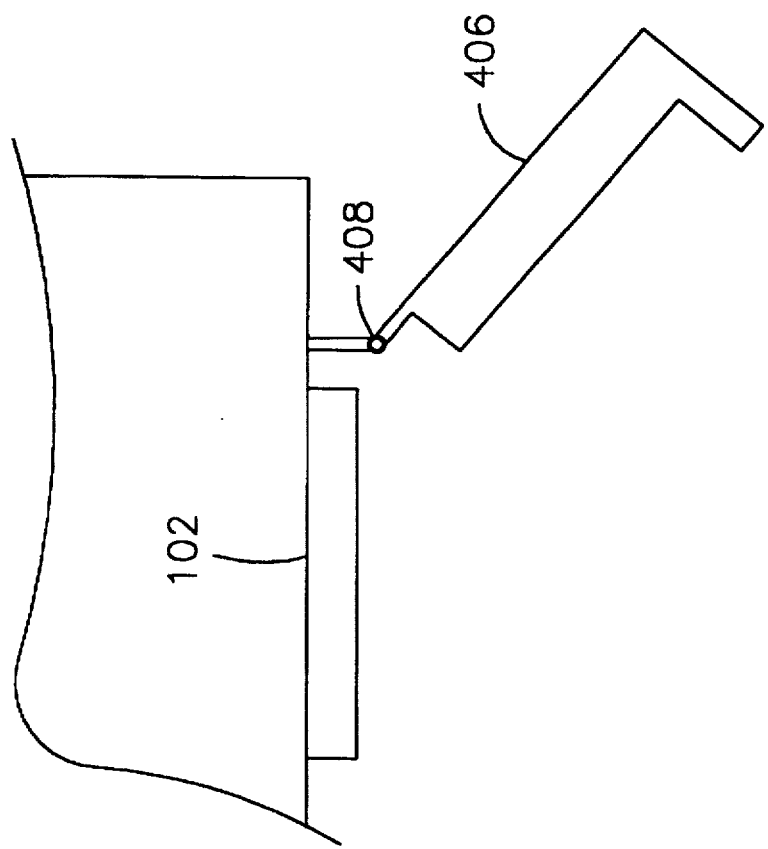

AUTOMATIC ENABLING/DISABLING OF TERMINATION IMPEDANCE FOR A COMPUTER BUS

FIELD OF INVENTION

This invention relates generally to computer bus signal termination and more specifically to automatic detection of whether a device on a computer bus should provide termination.

BACKGROUND OF THE INVENTION

In electronic systems, there is often a need to automatically detect if a cable or connector is attached. For example, a common problem is automatic detection of whether a device is at the end of a transmission line in order to properly provide a termination impedance for the transmission line.

For a particular example, a commonly used parallel input/output (I/O) system for computers, the Small Computer System Interface (SCSI), requires termination at each end (and only at each end) in a chain of devices. Although ANSI standards documents exist for SCSI, there have been proprietary variations and there has been an evolution of proposed extensions or improvements. SCSI signal lines may be single ended or differential. There are a variety of connectors being used. Finally, external devices claiming to conform to SCSI requirements have implemented a variety of termination alternatives as follows: passive termination internal to the device (typically socketed or jumpered for removability), active termination internal to the device, manually switchable or automatically switchable internal termination (active or passive), and external termination requiring an additional external connector with termination circuitry plugged into the extra external connector.

The variety of connector and termination schemes has led to customer confusion and the possibility of excessive termination within a chain of devices. In particular, a customer typically cannot determine externally whether a particular device has an internal termination and whether any internal termination is socketed, jumpered, or switched (passive or active). If a terminator is missing, or if a terminator is enabled when it should not be enabled, the SCSI bus may not function reliably.

One recent proposal, called Plug and Play SCSI, attempts to simplify the connector and termination problems by specifying one standard connector for external devices and by specifying that termination for external devices must be external to the devices. In particular, active external termination is required, with terminator power provided by a specific line in the SCSI bus. Each external device must have two visible external connectors. When external devices are chained together, only one connector can remain open and that one open connector must receive the one external active termination circuit. However, this still requires manual intervention, requires a separate additional-cost part, and creates a risk of performance loss if the part is lost. It requires a customer to purchase a separate terminator plug (active circuitry plus a connector) and to properly install that terminator plug on the one open external device connector. A more cost effective and foolproof system would result if the last device in a chain could sense when nothing is plugged into one of its two external connectors and to automatically switch in an internal active termination circuit if nothing is plugged into one of its external connectors.

One approach to automatic detection of the presence of an external connector is to select a line that is normally grounded by every device on the bus and for a particular external device, internally pull that line high instead of low (For example, see U.S. Pat. No. 5,434,516 to Kosco and U.S. Pat. No. 5,313,595 to Lewis et al). If the line is at ground, an external device must be connected. If the line is high, an external device is probably not connected. The word "probably" is used because the method assumes that not all devices on the bus use the same method. That is, the method assumes that at least one device on the bus pulls the sensed line low. If the method is standard so that every device on the bus uses the same method, then no device will pull the sensed line low. For SCSI systems, there is still a need for automatic sensing that can be standard for all devices. There is still a general need beyond SCSI systems for automatic detection of the presence of a mating connector.

SUMMARY OF THE INVENTION

A connector cover is provided for connectors on the peripheral device. The cover must be removed before an external mating connector can be attached. In one embodiment, the cover includes a projection that passes into the peripheral device when the cover is attached to a connector. In an alternative embodiment, the cover includes a reflective surface for reflective detection. The peripheral device includes a sensor for detecting the projection or for detecting the reflective surface. If the cover is present (projection or reflective surface detected), at least one connector must be empty and internal termination is automatically enabled. If no cover is present (projection or reflective surface not detected), internal termination is automatically disabled. The cover may be permanently attached by a hinge or tether. The cover and detection system makes no assumptions about other devices on the bus, thereby providing an automatic termination system that can work as a standard for all devices on the bus or as a termination system that is unique to one particular device on the bus.

BRIEF DESCRIPTION OF THE DRAWINGS

FIG. 1 is a top view cross section block diagram of a peripheral device on a computer bus with a connector cover and sensor in accordance with the invention.

FIG. 3A is a front right perspective view of a connector panel and an alternative embodiment of a connector cover with a snap-on hinge.

FIG. 4 is a top view of a connector cover having a hinge along an end.

DETAILED DESCRIPTION OF THE PREFERRED EMBODIMENT OF THE INVENTION

Figure 2A:
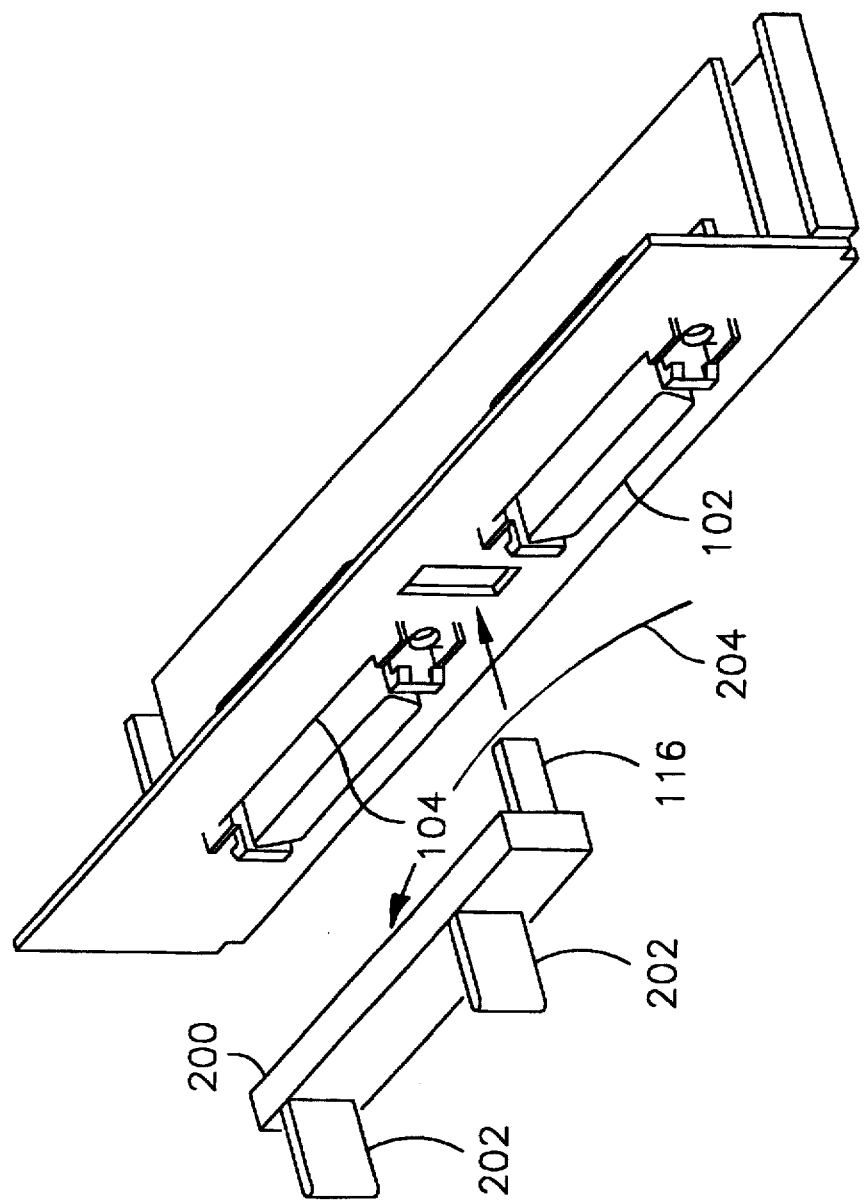
FIG. 2A is a front right perspective view of a connector cover and a removed connector panel for a peripheral device.

FIG. 1 illustrates a peripheral device 100 connected to a computer bus. Peripheral device 100 has two bus connectors 102 and 104 connected in parallel. Connector 102 is illustrated as being connected to cable connector 106 and bus cable 108. Bus cable 108 may, for example, connect to a SCSI bus. Bidirectional internal bus lines 110 are connected to a bus termination circuit 112. A cover 114 is placed over empty connector 104. The cover 114 has a projection 116 that extends through a rear panel of device 100. The presence or absence of the projection 116 is detected by a sensor 118. Sensor 118 may be a mechanical switch, an optoelectronic device, or any other device capable of detecting the presence of the projection 116. A sense line 120 from the sensor 118 enables or disables the termination circuit 112. If a projection 116 is detected, one connector 102 or 104 must be empty (not connected to a bus cable as in cable 108) and the termination circuit 112 is enabled. If no projection 116 is detected, it is assumed that both connectors 102 and 104 are connected to cable connectors and the termination circuit 112 is disabled.

For SCSI implementations, termination circuit 112 may be a commercially available active terminator circuit such as part number UC5608DW manufactured by Unitrode Corporation or a functionally similar part. Alternatively, an electrically controlled switch may be used to switch a passive terminator circuit in or out. Suitable photo interrupters for sensor 118 include part number GP1S561C from Sharp and part number EE-FX1025 from Omron.

Figure 2B:
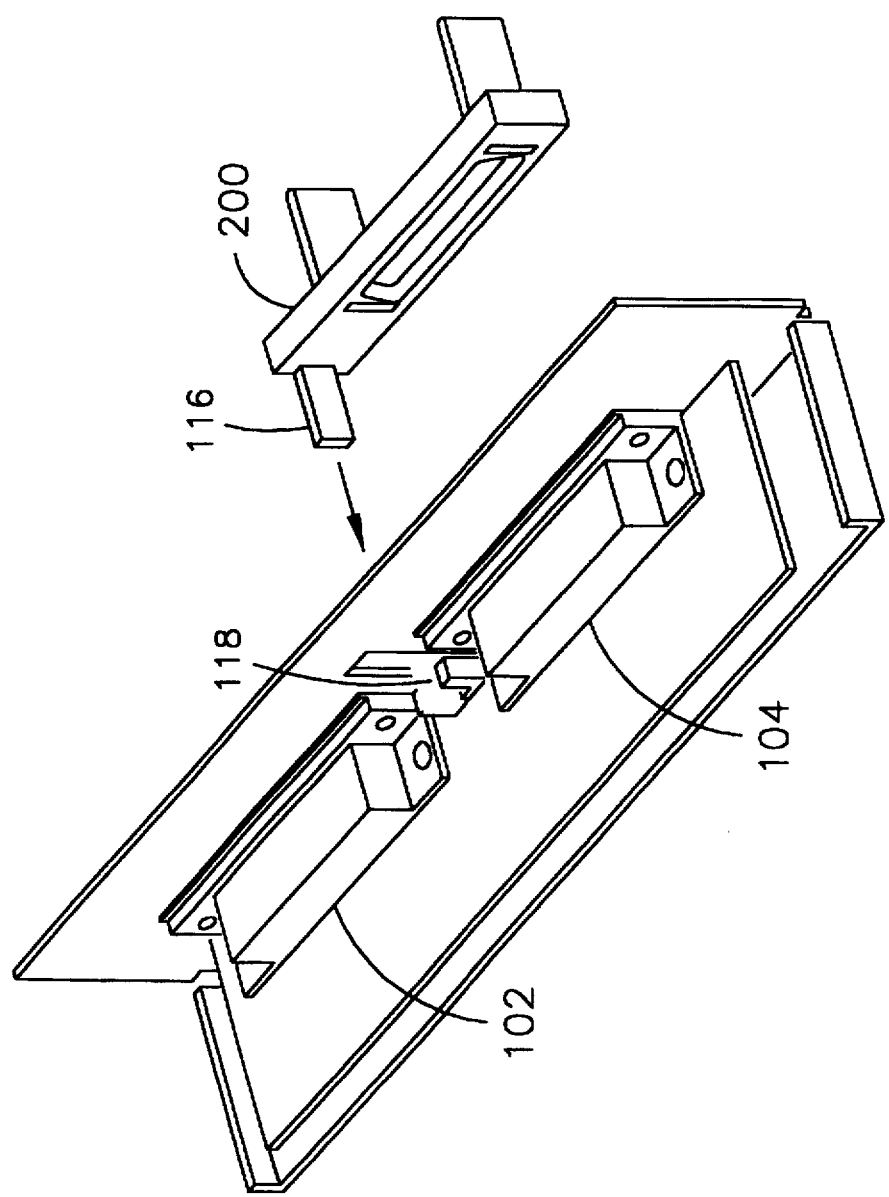
FIG. 2B is a rear left perspective view of the connector cover and connector panel of FIG. 2A.
Figure 2C:
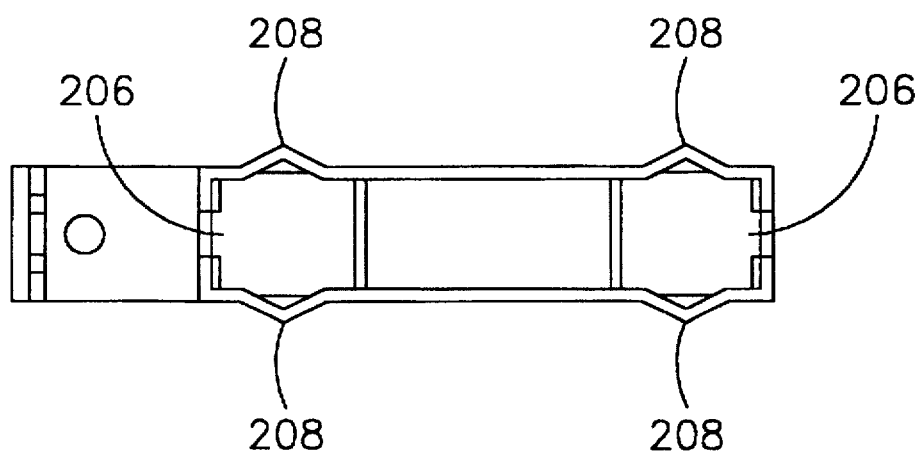
FIG. 2C is a rear view of the connector cover of FIG. 2A illustrating additional detail for a preferred embodiment.
Figure 2D:
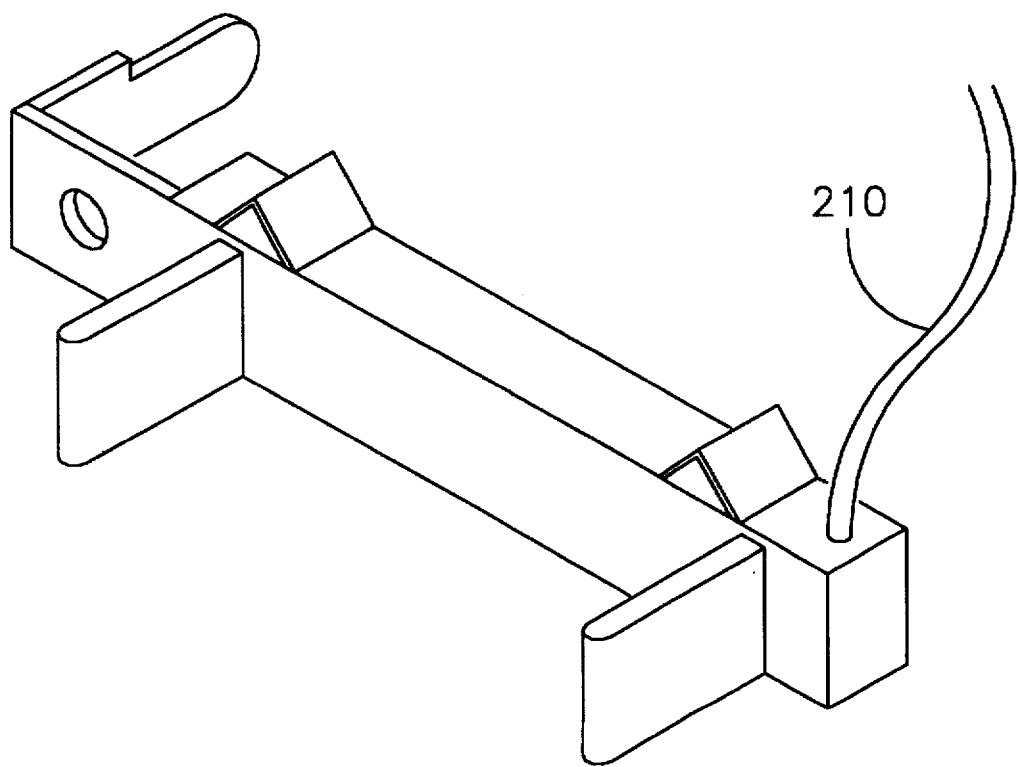
FIG. 2D is a front right perspective view of the connector cover embodiment of FIG. 2C illustrating an optional tether.

The cover 114 may be symmetrical top to bottom so that it can cover either connector 102 or 104 while still sharing a single sensor 118. FIG. 2A is a perspective view of a top to bottom symmetrical connector cover 200. The cover may be flipped 180° as shown by arrow 204 so that it can be used on either connector 102 or connector 104. Extended tabs 202 facilitate removal. Squeezing tabs 202 together expands the ends of cover 200 outward which facilitates clearance of hardware details on connectors 102 and 104. FIG. 2B illustrates a rear perspective view. FIG. 2C is a rear view of connector 200 illustrating additional detail. A notch 206 on each end and expanded areas 208 provide clearance for hardware details on connectors 102 and 104. Finally, FIG. 2D illustrates an alternative embodiment with a tether 210 that is attached to the peripheral device so that the cover cannot be misplaced by a customer.

Figure 3B:
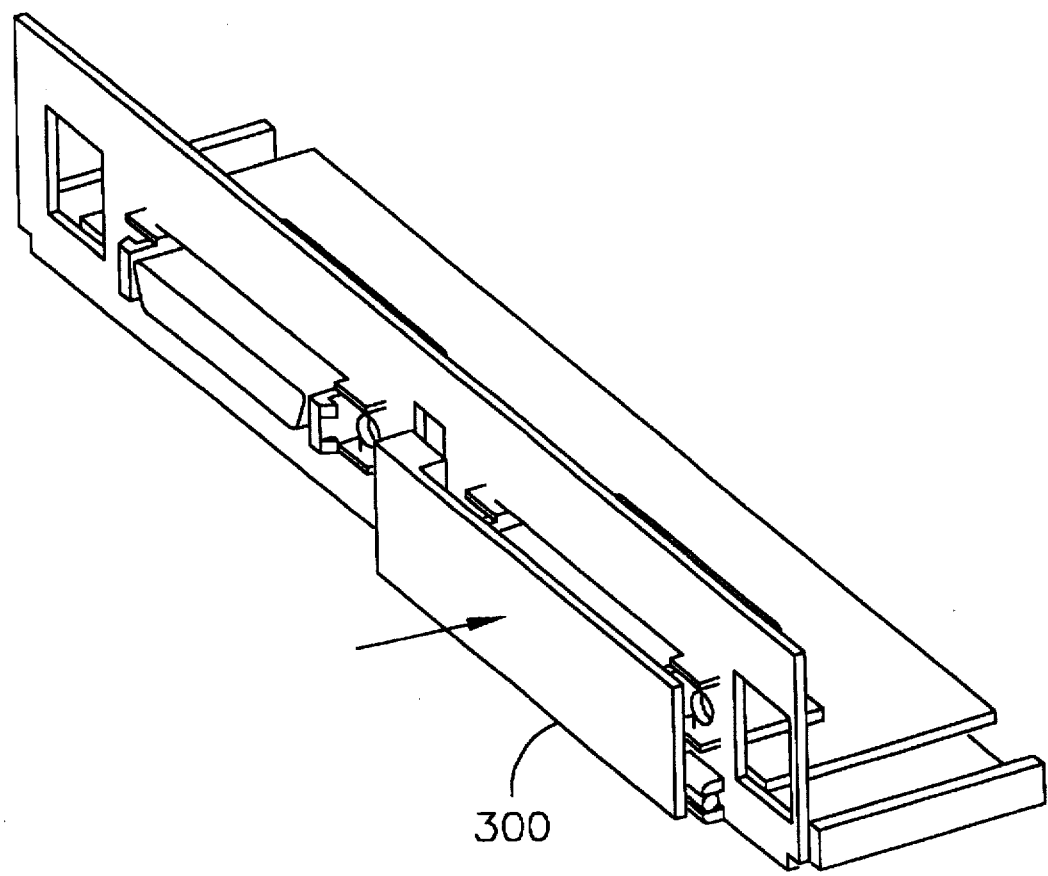
FIG. 3B is a front right perspective view of the connector cover of FIG. 3A in a closed position.
Figure 3C:
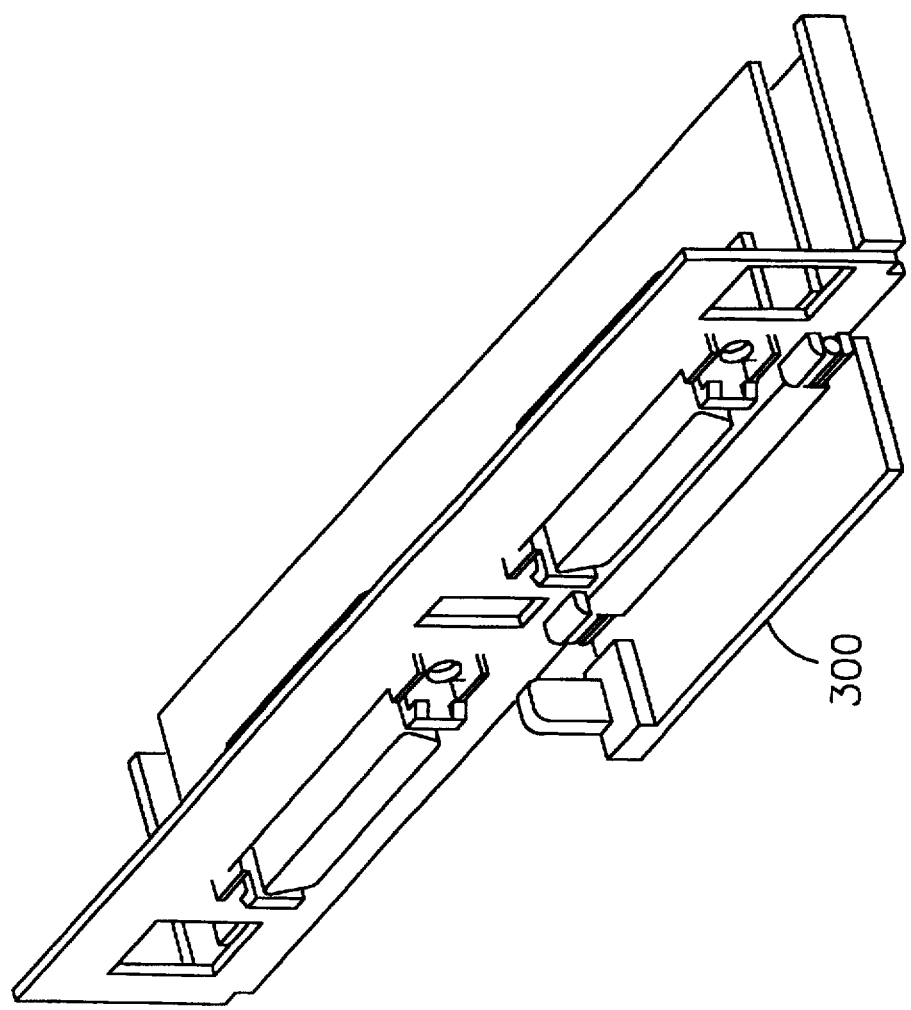
FIG. 3C is a front right perspective view of the connector cover of FIG. 3A in an open position with the hinge attached.
Figure 3D:
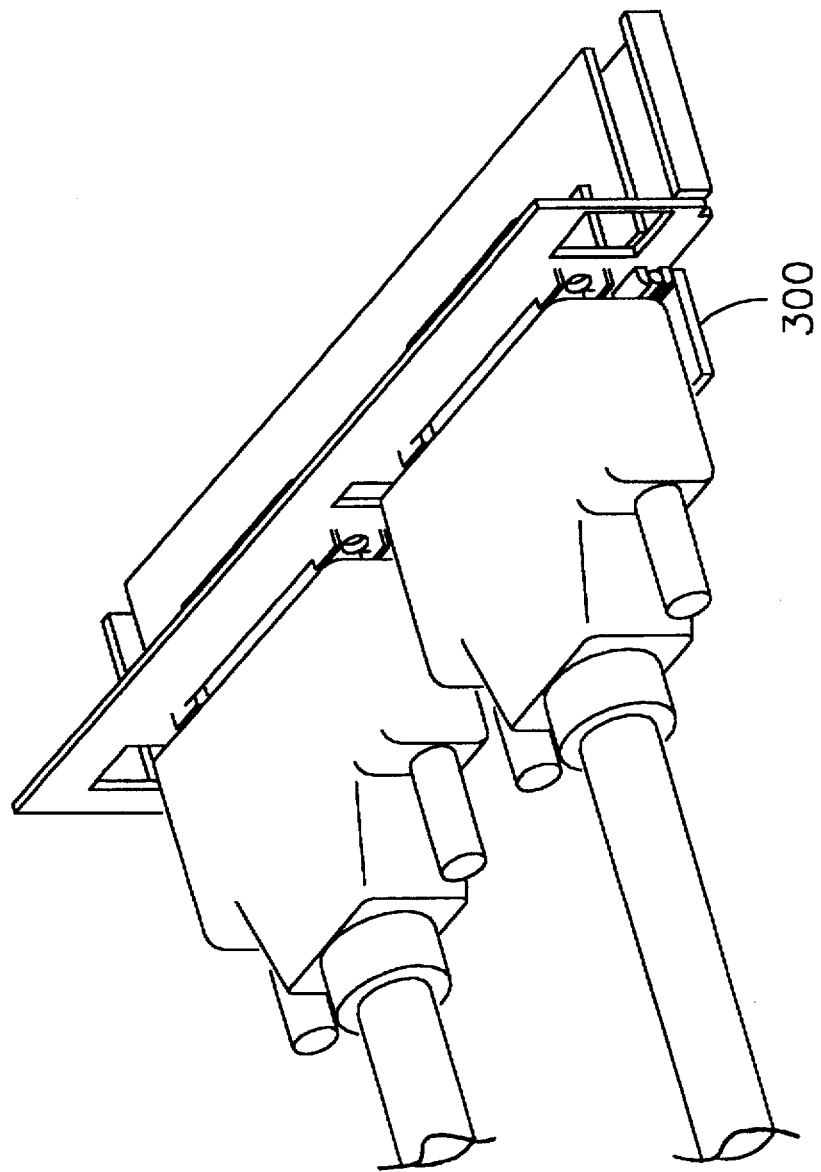
FIG. 3D is a front right perspective view of the connector panel and connector cover of FIG. 3A with the cover open and external connectors attached.

In alternative embodiments, the cover may be captured by a hinge so that it cannot be misplaced by a customer. FIG. 3A illustrates a cover 300 having a cylindrical hinge surface 302 along the bottom edge of the cover with snap-in mating surfaces 304 on the peripheral device. Projection 306 enters a slot in the peripheral device for detection. FIG. 3B illustrates cover 300 in a closed position. FIG. 3C illustrates cover 300 open with the hinge attached. FIG. 3D illustrates cover 300 open with external cables attached to the peripheral device. A single cover may be provided as illustrated in FIGS. 3A–3D with the requirement that if only one external cable is attached it must be attached to the peripheral connector having no cover. Alternatively, cover 300 may be made symmetrical top to bottom with a cylindrical hinge surface on both the top edge and the bottom edge and mating hinge surfaces may be provided on both peripheral connectors. Then, covers may be provided for both peripheral connectors or a single cover may be removably attached to either peripheral connector. FIG. 4 illustrates an alternative embodiment in which a cover 406 has a hinge 408 at one end instead of along the bottom or top edges.

Figure 5:
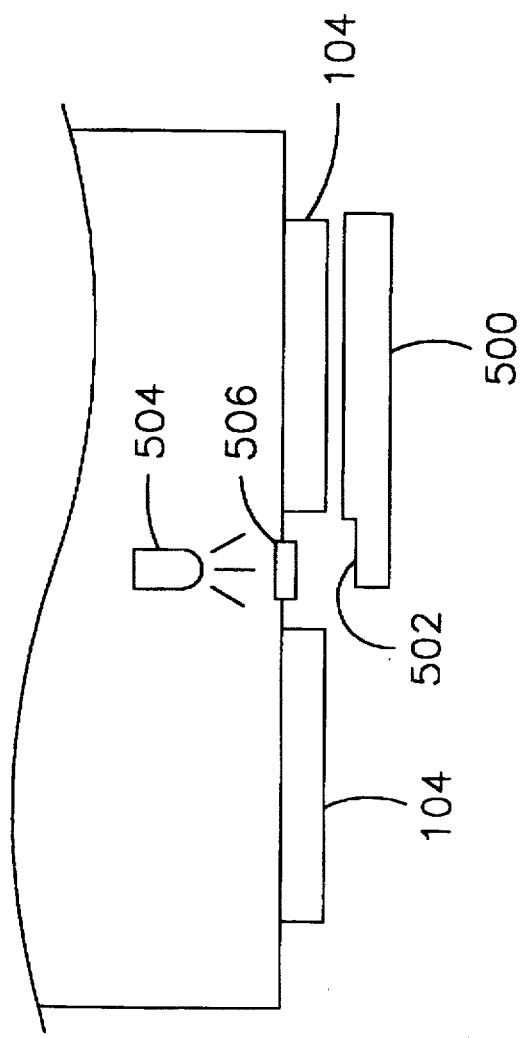
FIG. 5 is a top view of a connector cover having a reflective surface and a reflective sensor in the peripheral device.

FIG. 5 illustrates an alternative embodiment in which a reflective surface is used instead of a projection. Cover 500 includes a reflective surface 502. A sensor 504 is both a source of illumination and a light sensor. Sensor 504 shines light through an opening 506. If the cover 500 is present, light is reflected off the reflective surface 502 back to the sensor 504.

Note that the cover and detection system are independent of other devices on the bus. For example, there is no requirement for another device to provide a ground connection. Therefore, the termination system can work as a standard for all devices on the bus or the termination system can work as a system that is unique to one particular device on the bus.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. An apparatus for controlling a termination impedance circuit in a device on a computer bus, the apparatus comprising:

a connector cover;

a sensor in the device detecting the presence of the connector cover; and the sensor having a signal controlling enabling and disabling of the termination impedance circuit, the signal causing the termination impedance circuit to be enabled when the sensor detects the presence of the connector cover.

2. The apparatus of claim 1;

the connector cover further comprising a projection; and the sensor detecting the presence of the projection.

3. The apparatus of claim 1;

the connector cover further comprising a reflective surface; and the sensor detecting the presence of the reflective surface.

4. The apparatus of claim 1, the connector cover further comprising a hinged edge, attaching the connector cover to the device.

5. The apparatus of claim 1 further comprising a tether attached to the device and to the connector cover.

6. A method for automatic termination of a computer bus by a peripheral device on the computer bus, the method comprising the following steps:

(a) covering a connector on the peripheral device, by a cover, when the connector is not connected to the computer bus;

(b) detecting, by a sensor within the peripheral device, whether the cover is covering the connector; and (c) enabling termination by a termination impedance circuit when the sensor detects that the cover is covering the connector.

7. The method of claim 6, step (b) further comprising detecting, by the sensor, a projection on the cover.

8. The method of claim 6, step (b) further comprising detecting, by the sensor, a reflective surface on the cover.

* * * * *